United States Patent
Iizumi (10) Patent No.: US 9,612,406 B1
(45) Date of Patent: Apr. 4, 2017

(54) OPTICAL FIBER CONNECTOR

(71) Applicant: SENKO Advanced Components (HK) Ltd., Hong Kong (HK)

(72) Inventor: Kenji Iizumi, Hong Kong (HK)

(73) Assignee: SENKO Advanced Components (HK) Ltd., Hong Kong (HK)

( * ) Notice: Subject to any disclaimer, the term of this patent is extended or adjusted under 35 U.S.C. 154(b) by 0 days.

(21) Appl. No.: 14/985,320

(22) Filed: Dec. 30, 2015

(51) Int. Cl.
*G02B 6/36* (2006.01)
*G02B 6/38* (2006.01)

(52) U.S. Cl.
CPC ......... *G02B 6/3851* (2013.01); *G02B 6/3894* (2013.01)

(58) Field of Classification Search
CPC ............................ G02B 6/3851; G02B 6/3894
See application file for complete search history.

(56) References Cited

U.S. PATENT DOCUMENTS

5,216,733 A    6/1993    Nagase et al.

*Primary Examiner* — Sung Pak
(74) *Attorney, Agent, or Firm* — Spruson & Ferguson (Hong Kong) Limited (57) ABSTRACT

An optical fiber connector comprises a frame and a ferrule connectable together. The frame has a key insert inside an interior passage of the frame for mating with the ferrule. The ferrule has a flange configured to mate with the key insert. The flange includes a number of V-grooves, and the key insert has the same number of tips for mating with the V-grooves. For each of two sides of an individual V-groove, at least a portion thereof forms a substantially-seamless contact with a part of an outer surface of an individual tip during mating. Hence, the individual tip is prevented from making a motion in a direction parallel to flange, thereby resisting an undesired angular displacement between the connector and an optical fiber therein to occur due to an accidental rotational force applied to the connector after the frame and the ferrule are connected.

18 Claims, 8 Drawing Sheets

OPTICAL FIBER CONNECTOR

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to an optical fiber connector comprising a frame and a ferrule connectable together. Particularly, the present invention relates to such connector where a key insert in the frame is configured to mate with a flange on the ferrule for making the connection.

BACKGROUND

An optical fiber connector is a mechanical assembly that houses an optical fiber and acts as a mechanically-reinforced interfacing end thereto. The connector provides convenience to engineers and technicians in joining a plurality of optical fibers to form a single light transmission path. For some industrial applications, such optical fibers are used for carrying a polarized light beam and the light transmission path is required to maintain the polarization of the light beam over a long duration of time. As such, resistance against occurrence of an undesired angular displacement between the connector and the optical fiber due to accidental disturbance made to the connector is especially desirable and advantageous. There is a need in the art for an optical fiber connector that is resistant to responding to such accidental disturbance.

SUMMARY OF THE INVENTION

An optical fiber connector as provided herein for resisting against occurrence of the aforementioned undesired angular displacement comprises a frame and a ferrule connectable together, where the ferrule is configured to house an optical fiber.

The frame comprises an interior passage, a frame body that houses the interior passage, and a key insert for mating with the ferrule. The key insert is positioned in the interior passage and attached to the frame body. In addition, the key insert includes an end having an opening surrounded by a rim of the end. The key insert further includes a plurality of first mating members configured to mate with the ferrule.

The ferrule comprises a ferrule body and a flange protruded from the ferrule body. The flange includes a plurality of second mating members configured to mate with the plurality of first mating members.

The plurality of second mating members comprises a first pre-determined number of substantially-similar V-grooves formed on a lateral surface of the flange. An individual V-groove has two sides. The plurality of first mating members comprises the first pre-determined number of substantially-similar tips protruded from the rim. An individual tip has an outer surface.

For each of the two sides of the individual V-groove, at least a portion thereof forms a substantially-seamless contact with a part of the outer surface when the plurality of second mating members mates with the plurality of first mating members. It follows that the individual tip is prevented to make a motion in a direction parallel to the lateral surface of the flange, thereby resisting an undesired angular displacement between the connector and the optical fiber to occur due to a rotational force applied to the connector after the frame and the ferrule are connected.

Apart from the tips, preferably the plurality of first mating members further comprises a second pre-determined number of substantially-similar keys protruded from the rim. Correspondingly, the plurality of second mating members further comprises the second pre-determined number of substantially-similar receptacles on the lateral surface for receiving and accommodating the keys.

In one embodiment, each of the keys is formed as a blade, and each of the receptacles is a hole through the flange.

Other aspects of the present invention are disclosed as illustrated by the embodiments hereinafter.

DETAILED DESCRIPTION

An aspect of the present invention is to provide an optical fiber connector for housing an optical fiber and providing an interfacing end thereto. In particular, the connector has a useful feature of discouraging occurrence of an unwanted angular shift between the connector and the optical fiber when the connector receives an accidental turning force.

Figure 5:
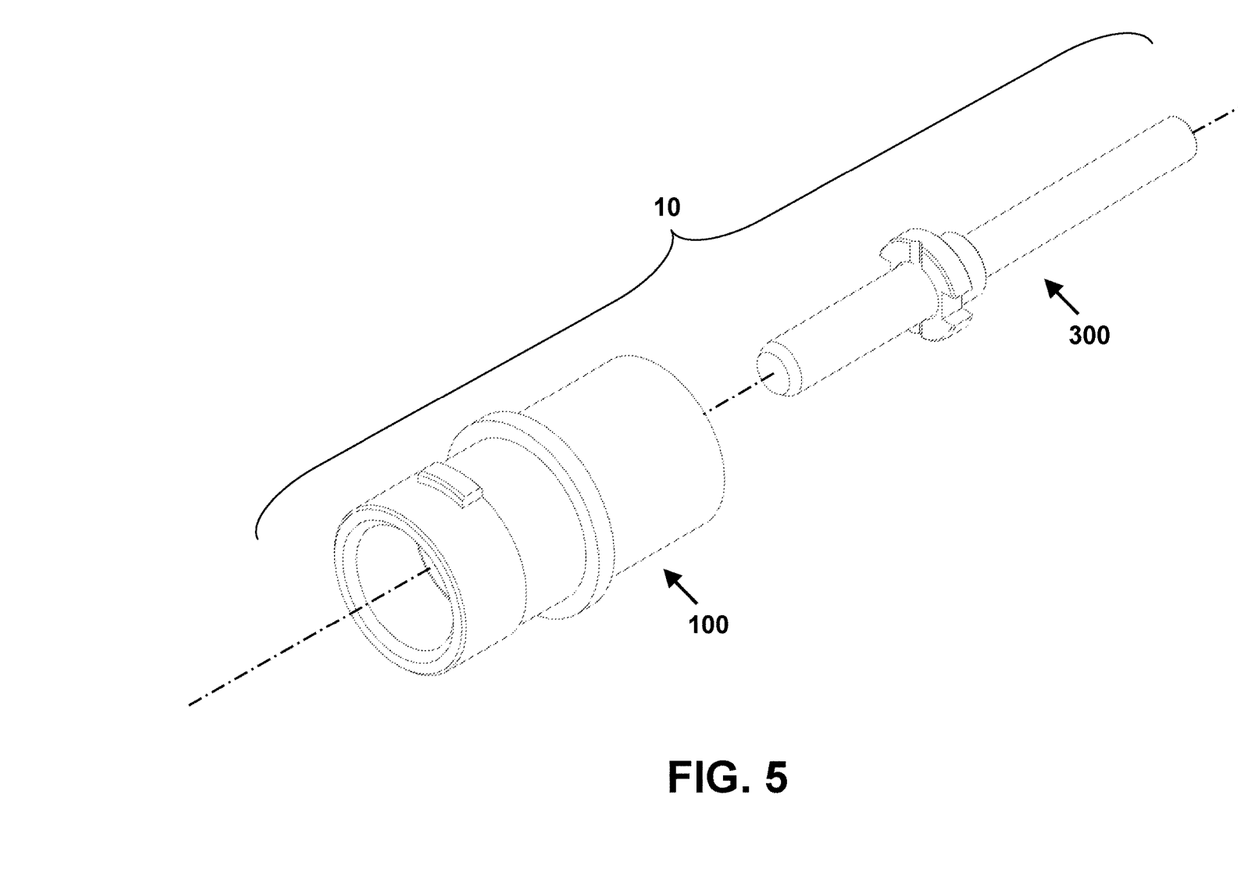
FIG. 5 depicts an exploded view of the connector, which has the frame and the ferrule.

The optical fiber connector provided herein is explained with an aid of FIG. 5, which depicts an exploded view of an optical fiber connector 10 according to an exemplary embodiment of the present invention. The optical fiber connector 10 comprises a frame 100 and a ferrule 300 connectable together. The ferrule 300 is configured to house the optical fiber. The frame 100 is intended to provide mechanical protection to the optical fiber as well as for other possible purposes, e.g., to provide convenience for a user to hold the connector 10.

Figure 1A:
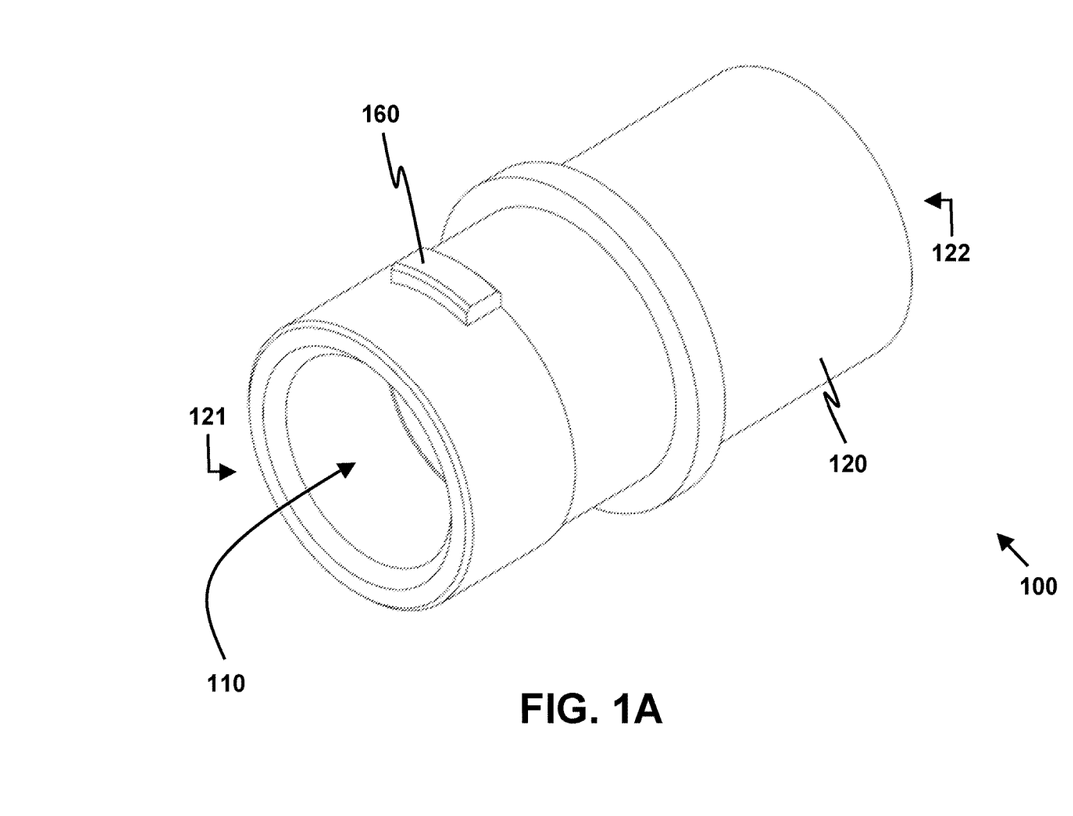
FIGS. 1A and 1B depict a perspective view and a cross-sectional view, respectively, of a frame of an optical fiber connector in accordance with an exemplary embodiment of the present invention.
Figure 1B:
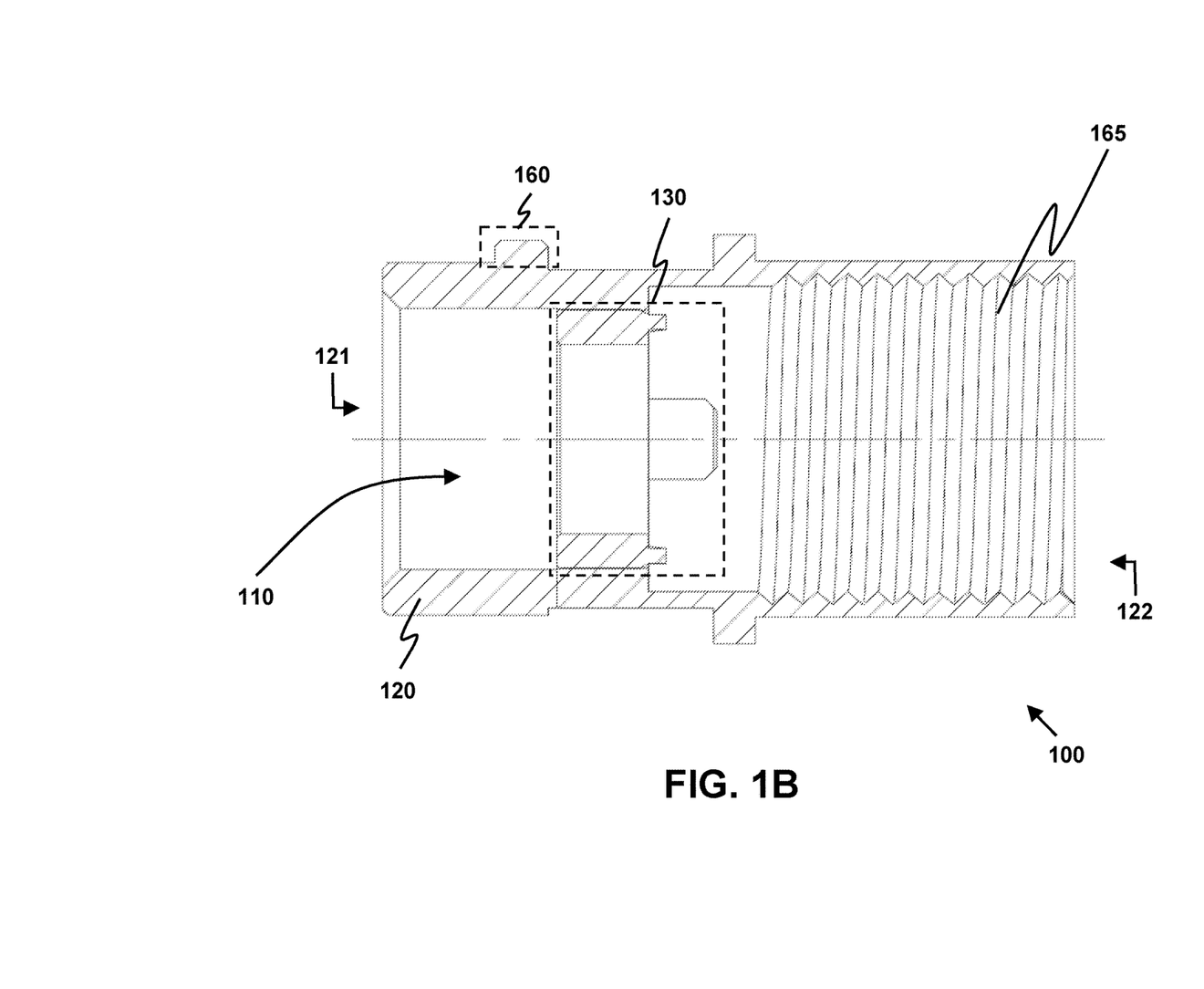

FIGS. 1A and 1B depict a perspective view and a cross-sectional view, respectively, of the frame 100. The frame 100 comprises an interior passage 110, a frame body 120 that houses the interior passage 110, and a key insert 130 for mating with the ferrule 300. The interior passage 110 allows the ferrule 300 to be plugged into the frame 100. The frame body 120 includes two ends 121, 122 as openings of the interior passage 110. The key insert 130 is positioned in the interior passage 110 and rigidly attached to the frame body 120.

Figure 2A:
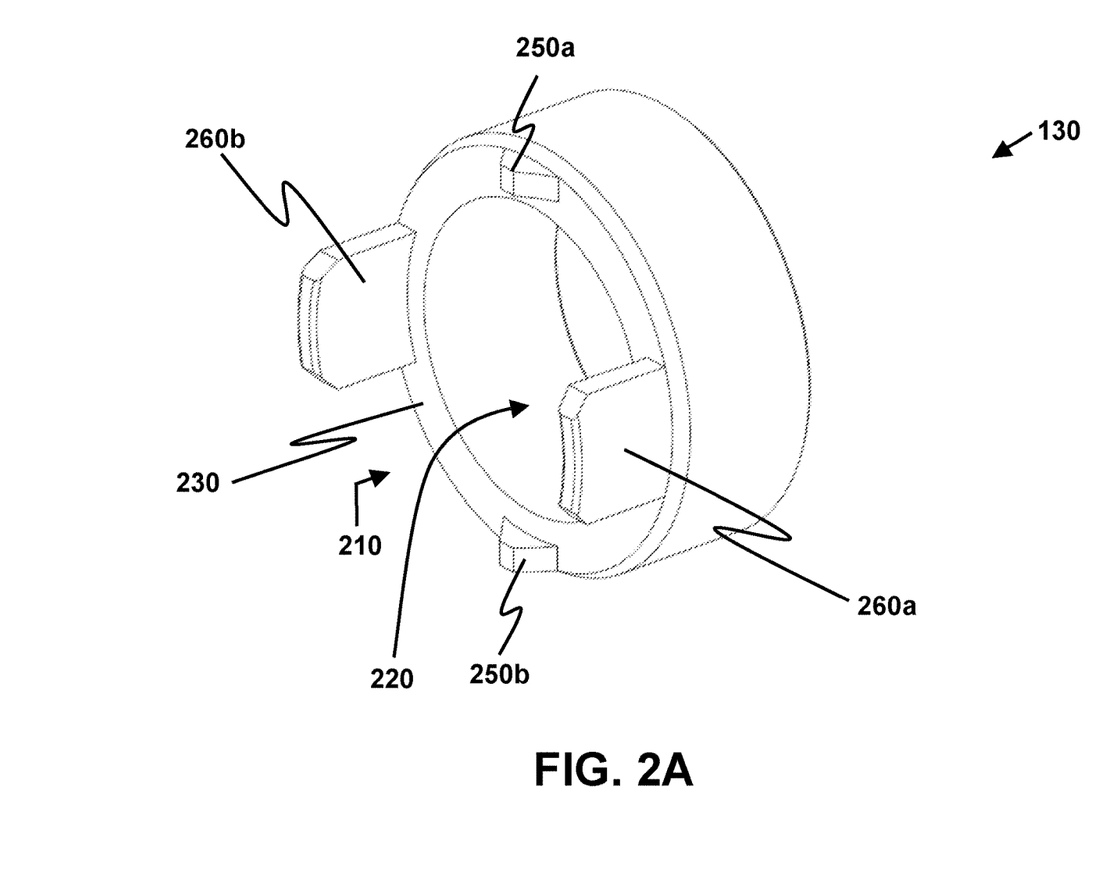
FIGS. 2A and 2B provide a perspective view and a front view, respectively, of a key insert that resides in a frame body of the frame shown in FIG. 1A or 1B.
Figure 2B:
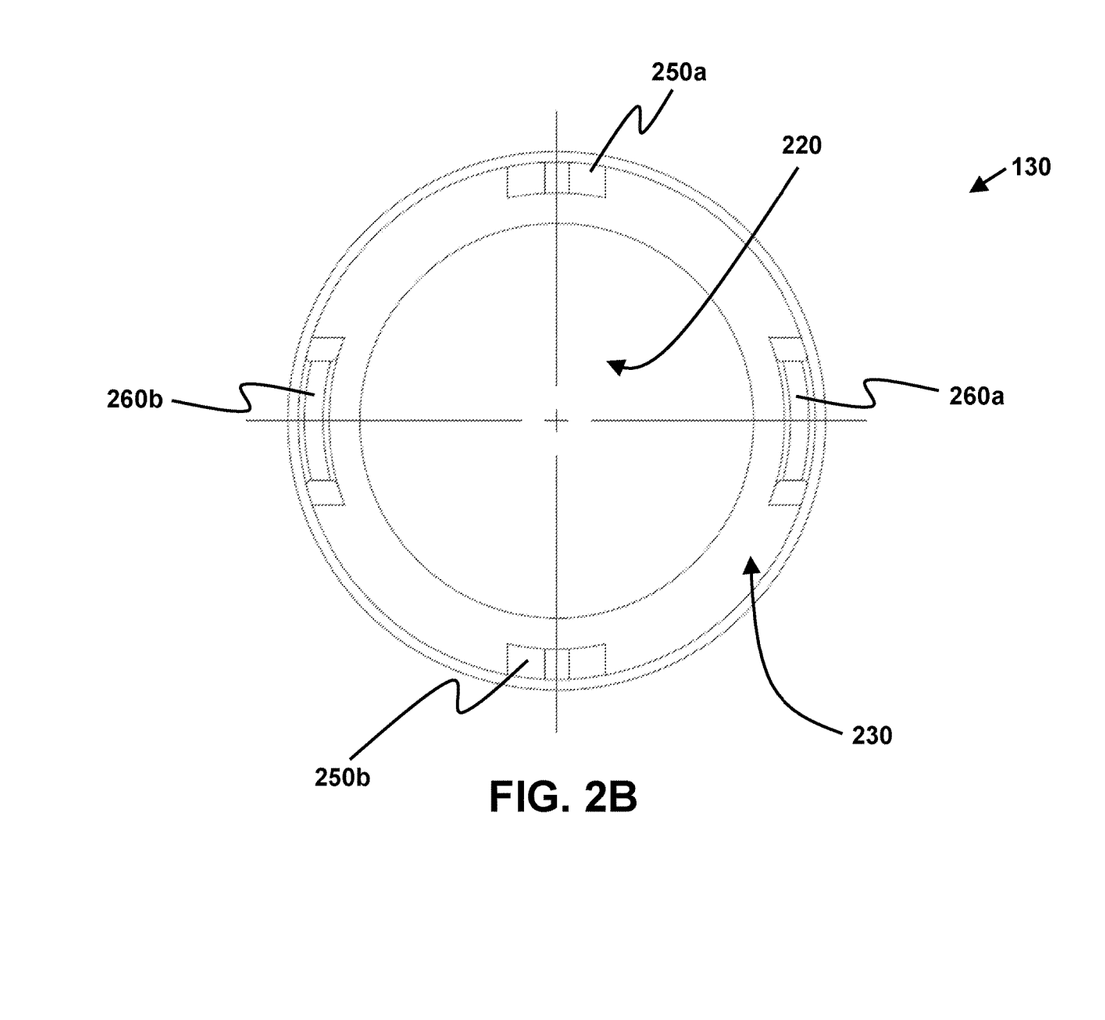

Details of the key insert 130 are elaborated with reference to FIGS. 2A and 2B, which provide a perspective view and a front view, respectively, of the key insert 130. The key insert 130 includes an end 210 having an opening 220 surrounded by a rim 230 of the end 210. For connecting the frame 100 and the ferrule 300, the key insert 130 further includes a plurality of first mating members 250a, 250b, 260a, 260b configured to mate with the ferrule 300. Although FIGS. 2A and 2B show that there are only four first mating members as an example for illustration, the present invention is not limited only to this case and the key insert can have any positive number of first mating members.

Figure 3A:
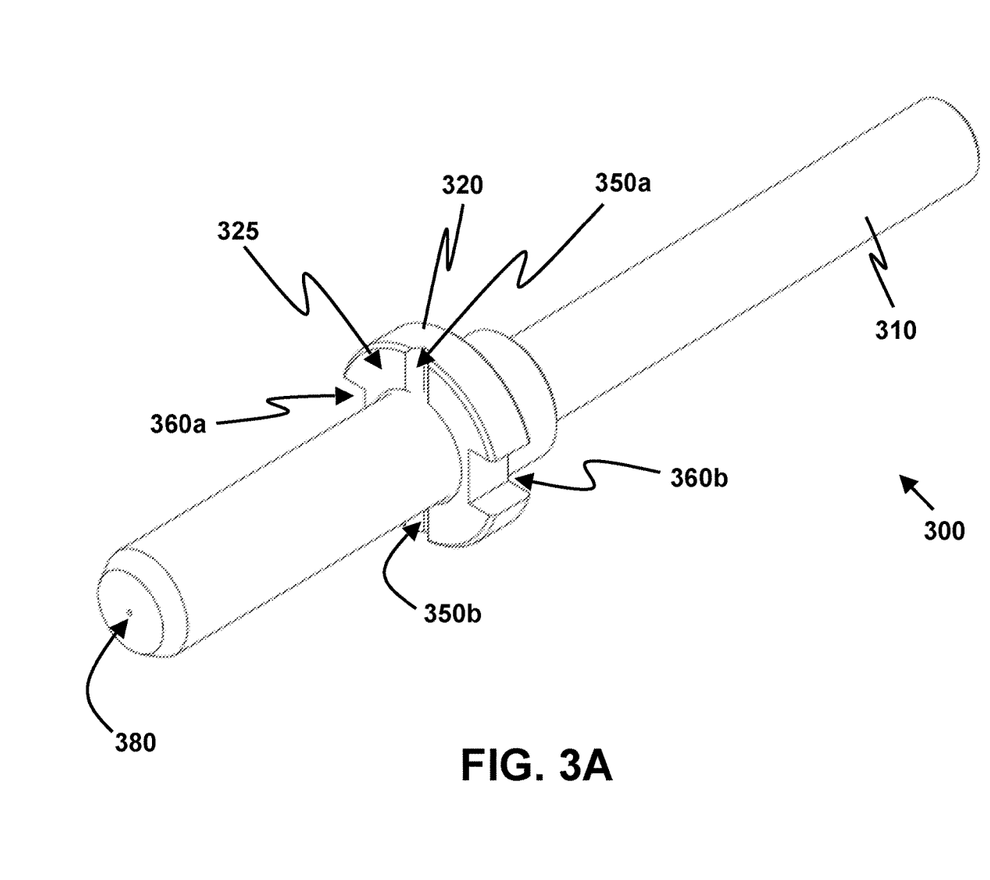
FIG. 3A provides a perspective view of a ferrule, which is configured to connect with the frame of FIG. 1A or 1B to form the connector in accordance with the exemplary embodiment of the present invention.
Figure 3B:
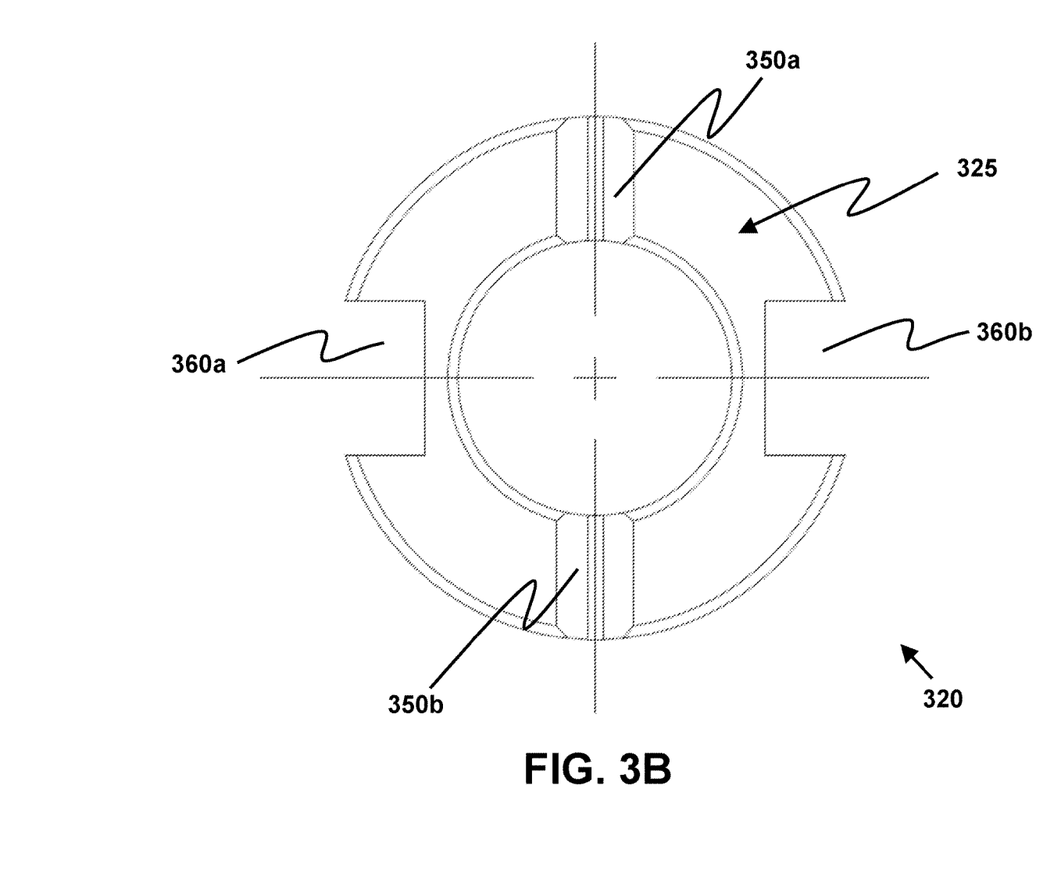
FIG. 3B depicts a front view of a flange, which attaches to a ferrule body of the ferrule of FIG. 3A.

FIG. 3A provides a perspective view of the ferrule 300. The ferrule 300 comprises a ferrule body 310 and a flange 320 protruded from the ferrule body 310. FIG. 3B gives a front view of the flange 320 to supplement FIG. 3A for more clearly illustrating the ferrule 300. The flange 320 includes a plurality of second mating members 350a, 350b, 360a, 360b configured to mate with the plurality of first mating members 250a, 250b, 260a, 260b. Similarly, although FIGS. 3A and 3B show that there are only four second mating members as an example for illustration, the present invention is not limited only to this case and the flange can have any positive number of second mating members.

The plurality of second mating members 350a, 350b, 360a, 360b comprises a first pre-determined number of substantially-similar V-grooves 350a, 350b formed on a lateral surface 325 of the flange 320. Each of the V-grooves 350a, 350b is formed as a recession on the lateral surface 325. Furthermore, the plurality of first mating members 250a, 250b, 260a, 260b comprises the first pre-determined number of substantially-similar tips 250a, 250b protruded from the rim 230. The V-grooves 350a, 350b respectively receive and mate with the tips 250a, 250b when the ferrule 300 is plugged into the interior passage 110 of the frame 100. In the illustrative example shown in FIGS. 2A and 3A, the first pre-determined number is two. Nonetheless, the first pre-determined number usable in the present invention is not limited only to two, but can be any positive integer.

To discourage occurrence of the unwanted angular shift between the connector 10 and the optical fiber, the tips 250a, 250b and the V-grooves 350a, 350b are advantageously configured as follows.

Figure 4:
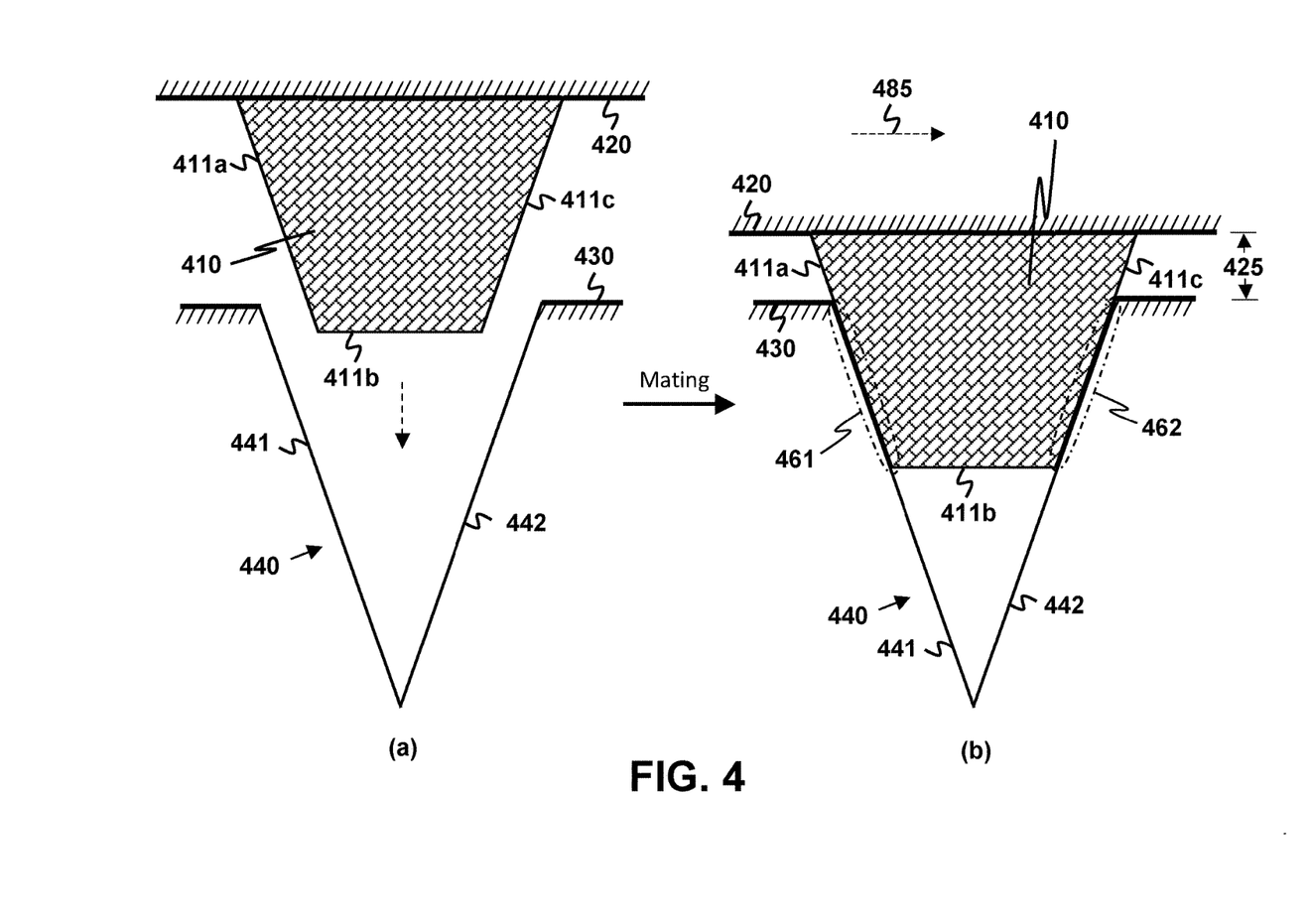
FIG. 4 depicts a top view of an individual tip on the key insert to mate with an individual V-groove on the flange for illustrating how to resist an undesired angular displacement between the connector and an optical fiber therein to occur due to an accidental rotational force applied to the connector.

It is obvious to a person skilled in the art that an individual V-groove among all of the substantially-similar V-grooves 350a, 350b has two sides, and that an individual tip among all of the substantially-similar tips 250a, 250b has an outer surface. FIG. 4 exemplarily depicts a top view of an individual tip 410 protruded from a rim 420 and an individual V-groove 440 recessed from a lateral surface 430. Furthermore, subplot (a) in FIG. 4 depicts a situation that the individual tip 410 moves towards the individual V-groove 440, and subplot (b) therein depicts another situation after the mating is done.

Refer to the subplot (a). The individual tip 410 has an outer surface including component surfaces 411a-c. Although not shown in FIG. 4, the outer surface also includes a top surface and a bottom surface of the individual tip 410. The individual V-groove 440 comprises a first side 441 and a second side 442. Note that the first side 441 and the second side 442 are surface areas.

Refer to the subplot (b). The first side 441 has a portion overlapping with a part of the component surface 411a. As such, the component surface 411a forms a substantially-seamless contact with the first side 441 over a first shared area (shared by the component surface 411a and the first side 441) that includes a first line segment 461. On the second side 442, a portion thereof overlaps with a part of the component surface 411c, so that the component surface 411c forms another substantially-seamless contact with the second side 442 over a second shared area (shared by the component surface 411c and the second side 442) that includes a second line segment 462. Advantageously, the combined effect of the two substantially-seamless contacts over two distinct shared areas containing the two line segments 461, 462, which are oppositely positioned, results in preventing the individual tip 410 from moving in a direction 485 that is parallel to the lateral surface 430. In the present invention, this combined effect is used to resist an undesired angular displacement between the connector 10 and the optical fiber to occur due to a rotational force applied to the connector 10 after the frame 100 and the ferrule 300 are connected.

One option in designing the connector 10 is that after the individual tip 410 is mated or engaged with the individual V-shape 440, the rim 420 comes into contact with the lateral surface 430. Alternatively, another design option is to leave a non-zero distance 425 between the rim 420 and the lateral surface 430 after mating, as depicted in the subplot (b) in FIG. 4.

Although FIG. 4 depicts that the individual tip 410 has a cross section that is a trapezoid as one embodiment for illustration, the aforesaid cross section may have other shapes, such as a triangle similar to a cross section of the individual V-groove 440.

Refer to FIGS. 2A and 2B. Apart from the tips 250a, 250b, preferably the plurality of first mating members 250a, 250b, 260a, 260b further comprises a second pre-determined number of substantially-similar keys 260a, 260b protruded from the rim 230. One advantage of using the keys 260a, 260b in addition to employing the tips 250a, 250b is to more securely engage the frame 100 with the ferrule 300. Correspondingly, as shown in FIGS. 3A and 3B, the plurality of second mating members 350a, 350b, 360a, 360b further comprises the second pre-determined number of substantially-similar receptacles 360a, 360b on the lateral surface 325 for receiving and accommodating the keys 260a, 260b. Although the second pre-determined number as implied by FIGS. 2A, 2B, 3A and 3B is two, the present invention is not limited to this value, and the second pre-determined number can be any positive integer. In one embodiment, each of the keys 260a, 260b is formed as a blade, and each of the receptacles 360a, 360b is a hole through the flange 320.

The first pre-determined number may be equal to the second pre-determined number. In one embodiment, they are set to be two, as shown in FIGS. 2B and 3B. In another embodiment, as is also shown in FIGS. 2B and 3B, all the tips 250a, 250b and the keys 260a, 260b are substantially-uniformly distributed on the rim 230, and are arranged in an interleaving manner along the rim 230. Correspondingly, the V-grooves 350a, 350b and the receptacles 360a, 360b are also substantially-uniformly distributed on the lateral surface 325, and are arranged in an interleaving manner along the lateral surface 325.

Refer to FIGS. 1A, 2A and 3A. Since the ferrule 300 is plugged into the frame 100, and since the plurality of first mating members 250a, 250b, 260a, 260b of the key insert 130 is arranged to mate with the plurality of second mating members 350a, 350b, 360a, 360b of the flange 320, it follows that dimensions of the ferrule body 310, the flange 320 and the opening 220 satisfy the following requirement.

When the ferrule 300 is inserted into the frame 100 through the interior passage 110, the ferrule body 310 is capable of passing through the opening 220 but the flange 320 is stopped at the key insert 130 so as to allow the flange 320 to receive the key insert 130 for connecting the ferrule 300 and the frame 100.

The connector 10 may also include one or more of the following options for enhancing its functionality.

Any part of the connector 10 may be chamfered for protecting a human user of the connector 10 from being cut. For example, any of the keys 260a, 260b, any of the tips 250a, 250b, the flange 320 or the ferrule body 310 may be chamfered.

The frame 100 may further comprise a fixed key 160 on the frame body 120 for enabling the frame 100 to mate with an external housing (not shown in FIGS. 1A and 1B) that houses the frame 100. The external housing may be used for providing additional protection to the frame 100, or for other purposes.

The frame body 120 may have a screw thread 165 for mounting the frame to an external structure (not shown in FIGS. 1A and 1B). The screw thread 165 may be an internal thread inside the frame body 120 as shown in FIG. 1B. It is also possible that the screw thread is an external thread (not shown in FIG. 1B).

Since the connector 10 is used for housing the optical fiber, one configuration of the connector 10 is that the ferrule 300 further comprises an open chamber 380 inside the ferrule body 310 for accommodating the optical fiber.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. An optical fiber connector comprising a frame and a ferrule connectable together, the ferrule being configured to house an optical fiber, wherein:
   the frame comprises an interior passage, a frame body that houses the interior passage, and a key insert for mating with the ferrule, the key insert being positioned in the interior passage and attached to the frame body, the key insert including an end having an opening surrounded by a rim of the end, the key insert further including a plurality of first mating members configured to mate with the ferrule;
   the ferrule comprises a ferrule body and a flange protruded from the ferrule body, the flange including a plurality of second mating members configured to mate with the plurality of first mating members;
   the plurality of second mating members comprises a first pre-determined number of substantially-similar V-grooves formed on a lateral surface of the flange, wherein each of the V-grooves having two sides; and
   the plurality of first mating members comprises the first pre-determined number of substantially-similar tips protruded from the rim, wherein each of the tips having an outer surface, and wherein for each of the two sides of each of the V-grooves, at least a portion thereof forms a substantially-seamless contact with a part of the outer surface when the plurality of second mating members mates with the plurality of first mating members, preventing the individual tip from making a motion in a direction parallel to the lateral surface of the flange to thereby resist an undesired angular displacement between the connector and the optical fiber to occur due to a rotational force applied to the connector after the frame and the ferrule are connected.

2. The connector of claim 1, wherein:
   dimensions of the ferrule body, the flange and the opening are selected such that when the ferrule is inserted into the frame through the interior passage, the ferrule body is capable of passing through the opening but the flange is stopped at the key insert so as to allow the flange to receive the key insert for connecting the ferrule and the frame.

3. The connector of claim 1, wherein the tip has a cross section being a trapezoid.

4. The connector of claim 1, wherein the tip has a cross section being a triangle.

5. The connector of claim 1, wherein:
   the plurality of first mating members further comprises a second pre-determined number of substantially-similar keys protruded from the rim; and
   the plurality of second mating members further comprises the second pre-determined number of substantially-similar receptacles on the lateral surface for receiving and accommodating the keys.

6. The connector of claim 5, wherein each of the keys is formed as a blade, and each of the receptacles is a hole through the flange.

7. The connector of claim 5, wherein the first pre-determined number is equal to the second pre-determined number.

8. The connector of claim 7, wherein the first pre-determined number and the second pre-determined number are equal to two.

9. The connector of claim 7, wherein all the tips and the keys are substantially-uniformly distributed on the rim, and are arranged in an interleaving manner along the rim.

10. The connector of claim 9, wherein the first pre-determined number and the second pre-determined number are equal to two.

11. The connector of claim 5, wherein each of the keys is chamfered.

12. The connector of claim 1, wherein each of the tips is chamfered.

13. The connector of claim 1, wherein the flange is chamfered.

14. The connector of claim 1, wherein the ferrule body is chamfered.

15. The connector of claim 1, wherein the frame further comprises a fixed key on the frame body for enabling the frame to mate with an external housing that houses the frame.

16. The connector of claim 1, wherein the ferrule further comprises an open chamber inside the ferrule body for accommodating the optical fiber.

17. The connector of claim 1, wherein the frame body has a screw thread for mounting the frame to an external structure.

18. The connector of claim 1, wherein the screw thread is an internal thread.

* * * * *